(12) United States Patent
Cummings et al.

(10) Patent No.: US 10,445,992 B2
(45) Date of Patent: Oct. 15, 2019

(54) TRAFFIC SIGN MOUNTABLE LIGHT PANELS

(71) Applicant: MOR Manufacturing Corporation, Post Falls, ID (US)

(72) Inventors: Ken Cummings, Post Falls, ID (US); John Ragan, Hayden, ID (US); Chris Beaty, Post Falls, ID (US)

(73) Assignee: MOR Manufacturing Corporation, Post Falls, ID (US)

( * ) Notice: Subject to any disclaimer, the term of this patent is extended or adjusted under 35 U.S.C. 154(b) by 0 days.

(21) Appl. No.: 15/665,403

(22) Filed: Jul. 31, 2017

(65) Prior Publication Data
US 2018/0033259 A1 Feb. 1, 2018

Related U.S. Application Data

(60) Provisional application No. 62/369,021, filed on Jul. 29, 2016.

(51) Int. Cl.
*G08B 5/00* (2006.01)
*G09F 13/04* (2006.01)
(Continued)

(52) U.S. Cl.
CPC .............. *G08B 5/006* (2013.01); *G01S 13/04* (2013.01); *G01S 13/584* (2013.01); *G01S 13/91* (2013.01);
(Continued)

(58) Field of Classification Search
CPC ........ G08B 5/006; G08B 5/38; G08G 1/0955; G08G 1/056; G08G 1/0133; G08G 1/0116;
(Continued)

(56) References Cited

U.S. PATENT DOCUMENTS 5,440,464 A * 8/1995 Nowlin .................. G08B 5/006
340/321
6,198,410 B1 * 3/2001 White ..................... G09F 9/307
340/907

(Continued)

OTHER PUBLICATIONS

2009 Edition of the Manual on Uniform Traffic Control Devices, 2009, The Federal Highway Administration, Chapter 2A, see at least Sections 2A.06-2A.07.*

(Continued)

*Primary Examiner* — Brian Wilson (57) ABSTRACT

A system for detecting a vehicle traveling a designated direction of travel on a roadway includes a sign having a front surface and a back surface. The sign may include a sign boundary marker that is different in color than a color of the front surface. One or more light panels such as an LED light panel is affixed to the sign such as to its front surface. The light emitting elements may lie below a top plane of the light panel. A color of a top surface of the light panel matches a color on the front surface of the sign over which the light panel is placed. A vehicle motion detector or proximity detector is oriented in a direction and has a detection zone for detecting moving vehicles in proximity to the sign. The detector illuminates the lights of the light panel after detecting a moving vehicle in proximity to the sign.

17 Claims, 4 Drawing Sheets

(51) Int. Cl.

| | |
|---|---|
| *G09F 9/33* | (2006.01) |
| *G08G 1/0955* | (2006.01) |
| *G09F 27/00* | (2006.01) |
| *G01S 13/04* | (2006.01) |
| *G01S 13/58* | (2006.01) |
| *G01S 13/91* | (2006.01) |
| *G06K 9/00* | (2006.01) |
| *G09F 19/22* | (2006.01) |
| *G08G 1/01* | (2006.01) |
| *G08G 1/056* | (2006.01) |
| *G08B 5/38* | (2006.01) |
| *G09F 13/22* | (2006.01) |

(52) U.S. Cl.
CPC ........... *G06K 9/00* (2013.01); *G06K 9/00771* (2013.01); *G08B 5/38* (2013.01); *G08G 1/0116* (2013.01); *G08G 1/0133* (2013.01); *G08G 1/056* (2013.01); *G08G 1/0955* (2013.01); *G09F 9/33* (2013.01); *G09F 13/04* (2013.01); *G09F 19/22* (2013.01); *G09F 27/005* (2013.01); *G09F 2013/0472* (2013.01); *G09F 2013/222* (2013.01)

(58) Field of Classification Search
CPC ...... G09F 13/04; G09F 9/33; G09F 2013/222; G09F 2013/0472; G09F 19/22; G09F 27/005; G06K 9/00; G06K 9/00771; G01S 13/91; G01S 13/584; G01S 13/04
See application file for complete search history.

(56) References Cited

U.S. PATENT DOCUMENTS

| | | | |
|---|---|---|---|
| 2006/0061487 A1* | 3/2006 | Heap | G09F 13/22 340/908 |
| 2013/0152436 A1* | 6/2013 | Cai | E01F 9/615 40/578 |
| 2017/0018179 A1* | 1/2017 | Gutierrez | H04L 67/12 |

OTHER PUBLICATIONS

2009 Edition of the Manual on Uniform Traffic Control Devices, 2009, The Federal Highway Administration, Chapter 2A, see at least Sections 2A.06-2A.07 (Year: 2009).*

CatEye, CatEye Safety Lights, pp. 1-4, Mar. 19, 2015 (Year: 2015).*

\* cited by examiner

TRAFFIC SIGN MOUNTABLE LIGHT PANELS

CROSS-REFERENCE TO RELATED APPLICATIONS

This application claims priority to, and incorporates herein in its entirety, U.S. patent application having Ser. No. 62/369,021 and titled Traffic Sign Mountable Light Panels, which was filed with the USPTO on 29 Jul. 2016.

BACKGROUND

Field

This disclosure relates to attaching lights such as LED-based lights to traffic signs for increased visibility and safety.

Description of Related Art

Too often, drivers of automotive vehicles miss or ignore important traffic control signs. The cost of accidents is significant. Drivers often travel substantial distances based on incorrect information. Many adverse incidents can be avoided.

While illumination techniques have been implemented, often added illumination is ignored because illumination is unresponsive to its environment. That is, humans tend to ignore signs that are always illuminated thus defeating the purpose of adding illumination to especially critical or important signs and other infrastructure.

BRIEF DESCRIPTION OF THE DRAWINGS

The present disclosure may be better understood and its numerous features and advantages made apparent to those skilled in the art by referencing the accompanying drawings. The use of the same reference symbols in different drawings indicates similar or identical items.

DETAILED DESCRIPTION

By using the devices, systems and methods described herein, substantial savings in life and bodily harm can be obtained. Prototypes and testing have been done to ensure that these devices, systems and methods function as described.

Based on research, a need was identified to produce devices and systems for detecting the approach or presence of vehicle traffic and for activating illumination devices in reaction to a set of circumstances. Active illumination draws the attention of a vehicle operator to existing traffic control signage and markings. The added illumination increases the chance of raising environment awareness of a vehicle operator. Millions of vehicles are operated daily in this country and many more in other countries.

By way of example, an illuminated sign may bring to the attention of the operator a proper perspective of a topological feature, a constant situation with a known risk or emergent condition such as a condition related to weather or the likely presence of children making their way home after school.

An illuminated sign has a greater chance than a non-illuminated sign of correcting an error of a vehicle operator. An illuminated sign may communicate valuable information to the operator in time for the operator to take appropriate action and avoid an undesirable consequence.

The illuminated sign as described herein is part of a reliable, low cost and self-contained system that is easily added to existing infrastructure. FIGS. 1-4 illustrate example devices and systems. As shown and described herein, these devices do not visually change the shape or color of a traffic sign or other marking to which it is affixed according to some embodiments.

Figure 1:
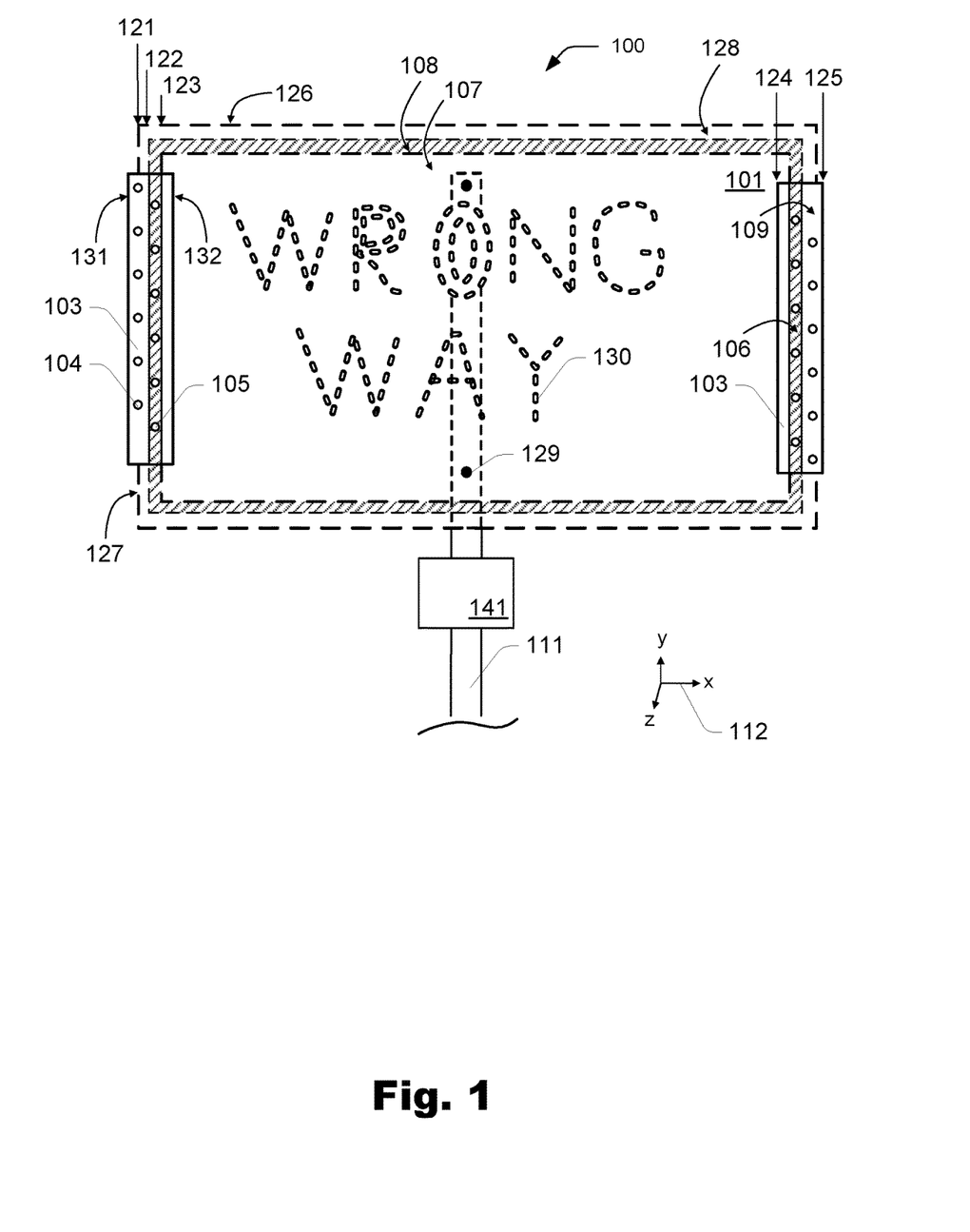
FIG. 1 is a diagram illustrating a front view of a sign fitted with lights along a portion of a perimeter of the sign in accordance with some embodiments.

FIG. 1 is a diagram illustrating a front view of a sign fitted with lights along a portion of a perimeter of the sign in accordance with some embodiments. FIG. 1 illustrates a system 100 fitted to a wrong way sign 101 mounted to a post 111 and with light-equipped strips 103 attached to a left side and a right side of the sign 101. In FIG. 1, each light-equipped strip 103 includes two columns 104, 105 of lights in the example shown. Other numbers of rows, columns, or rows and columns are possible.

In a particular embodiment, a first column 104 of LED lights is aligned and overlaps the white stripe 128 along the edge of the front face 107 of the sign 101. The first column 104 is in a white stripe 109 of the light-equipped strips 103. A second column 105 of LED lights is aligned in the colored stripe 106 of the light-equipped strip 103. The colored stripe 106 of the strips 103 is aligned with and overlaps the colored stripe 108 of the sign 101. The front face 107 of the sign 101 includes a colored stripe 108 of tape, paint, or other material that provides a border for the sign 101. According to an alternative embodiment, the second column 105 of LED lights may be formed and mounted inside the colored stripe 108 such as inside the colored stripe 108. For a wrong way sign, the LED lights would be mounted inside the border or band 108 over a traditionally red background of the wrong way sign.

In FIG. 1, a first arrow 121 indicates an outer horizontal edge 126 of the sign 101. A second arrow 122 indicates a width of the outer white edge 128 of the sign 101 as measured from the first arrow 121. A distance between the second arrow 122 and the third arrow 123 indicates a width of colored stripe 108 of the sign 101. Note that according to one embodiment, a width of the colored stripe 108 is between the second arrow 122 and the third arrow 123, and the width of the colored stripe 108 is uniform around a perimeter of the sign 108.

For any given sign 101, tape or paint may form lettering 130 on the front face 107 or front surface of the sign 101. A color of the lights such as in columns 104, 105 may be matched to an underlying color of the relevant portion of the sign 101. Alternatively, a color for each of the lights may be coordinated to be a contrasting color or non-matching color so as to further distinguish the illumination and to further draw attention to the sign. For example, lights in a red portion of the sign may be provided with white lights, with yellow lights, with green lights, and so forth. In another embodiment, a red portion of the sign 101 is provided with red lights, and a white portion of the sign such as boundary stripe 128 is provided with white lights in the first column 104 and red or colored lights in the red or colored stripe 106 of the strip 103. In FIG. 1, the sign 101 is mounted to the post 111 by one or more fasteners 129. In the embodiment shown, there is no light-equipped strip 103 on a top edge 126 or bottom edge, but only on a side or vertical edge 127. The strips 103 have an outer edge 131 and an inner edge 132. The outer edge 131 of the strip 103 may lie outside of the outer edge 127 of the sign 101, may be mounted flush to the outer edge 127 of the sign 101. Alternatively, the outer edge 131 of the light panel 103 may be mounted inside of the perimeter of the sign 101. While the inner edge 132 of the strips 103 is shown at a position 124 inside of the inner margin 123 of the stripe 108, the inner edge 132 may formed and aligned so as to be aligned with an outer edge 122 of the colored stripe 108 or so as to be aligned with an inner edge 123 of the colored stripe 108. A width of the light strip 103 may be measured from an inner edge 124 to an outer edge 125 as indicated by the arrows. The outer edge 125 of one or more light strip 103 may extend beyond a lateral side 127 or a horizontal side 126 of the sign 101.

When both columns 104, 105 of LED lights are illuminated, an attention of a vehicle operator is drawn to the sign 101. One aspect of the attachments includes at least one column of LED lights inside the boundary of the border 108. Lights in this area are not expected by observers and add an extra feature to a conventional sign. When the light panels or strips 103 are activated, the unconventional feature encourages the vehicle operator to actively turn and look at the lights. The light strips 103 are designed to initially blend into an appearance of each particular sign 101 or infrastructural element in terms of color. At least one lateral surface of the light panel 103 such as at an outer edge 131 may be black and the top face of the light panel 103 is a color of the border 128 of the sign 101. The inner part of the light panel is colored to match the background or face 107 of the sign 101.

In FIG. 1, as an example, the visual appearance of the inner boundary or visual edge 132 is different than the visual appearance of the outer boundary or edge 131 (e.g., black to white on the outer edge 131 of the light panel and red to black on the inner edge 132 of the light panel). This feature provides a psychological camouflage of the light panel 103 when the LED lights are not illuminated.

A detection system 100 as described herein is secured to an existing pole 111 or other structure. The sign 101 is attached by fasteners 129 such as threaded bolts as indicated in FIG. 1. In contrast to the sign 101 to the pole 111, in the implementation in FIG. 1, the light panels 103 are affixed by adhesive or glue, adhesive strip, or other means that does that require mechanically altering the sign such as by drilling or cutting mounting holes in the body of the sign. Such feature facilitates rapid attachment of the light panels 103 to the sign 101. The light panels 103 may or may not be self-powered. In FIG. 1, the light strips or panels 103 are powered by a power supply within a detector unit 141. In FIG. 1, the detector unit 141 is mounted to the pole 111. Power may be supplied by a cable or cord that is not illustrated for sake of convenience in FIG. 1.

The light strips 103 have a first or x-dimension, a second or y-dimension, and a third or z-dimension as indicated by the arrows 112. In FIG. 1, the strips 103 sit about a plane of the top surface 107 of the sign 101 by at least 1.0 mm. Each light of the columns 104, 105 of lights may sit flush inside of the holes or recesses. According to an alternative embodiment, each light of the columns 104, 105 of lights may sit recessed below a top surface of the strips 103.

Figure 2:
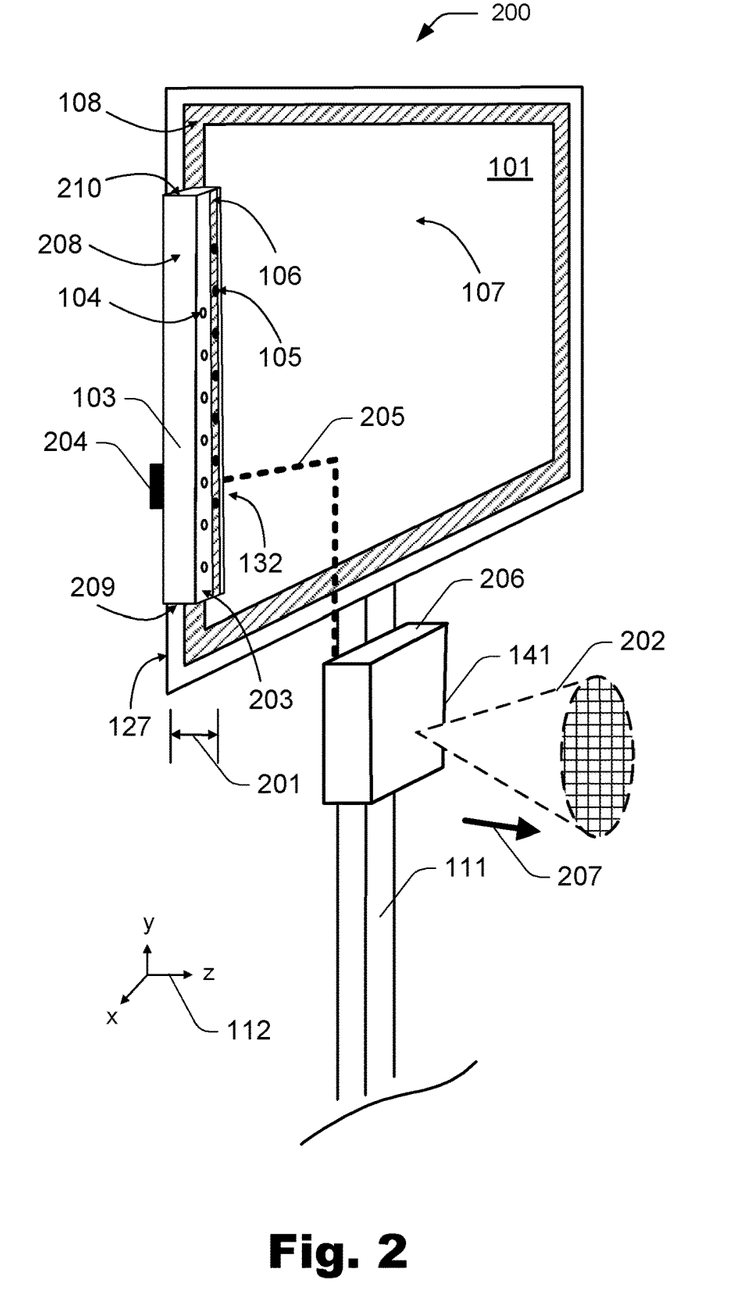
FIG. 2 is a diagram illustrating a side perspective view the sign fitted with lights along a portion of the perimeter of the sign in accordance with some embodiments illustrated in FIG. 1.

FIG. 2 illustrates a perspective view of the sign 101 first shown in FIG. 1. In FIG. 2, the system 200 includes a detector unit 141 inside of a housing 206. According to one example implementation, the detector unit 141 includes a K-band radar detector tuned to detect automotive vehicles from a distance of about 300-500 feet depending on a vehicle size. For example, the K-band radar detector operates at about 24.15 GHz and is direct sensing. The detector is FCC part 15 compliant. Other types of detectors are possible and may be coupled to the light panels 103. The detector unit 141, once it detects a traveling vehicle, is programmed to illuminate the columns 104, 105 of lights.

When a vehicle is detected, a controller, such as a controller within the housing 206, activates the LED lights of the light panel 103. For sake of convenience, only a single light panel 103 is shown in FIG. 2. For example, the controller may actively flash the lights according to a regular or irregular pattern. The lights may be flashed according to a temporal (time) pattern. The temporal pattern may vary according to a proximity of a vehicle or according to a detected speed of a vehicle with respect to a threshold such as a speed limit. For example, the LED lights may be blinked at a higher frequency for a vehicle being operated 10 miles per hour (MPH) over a posted speed limit than for a vehicle traveling at a speed that is 5 MPH over the posted speed limit. A faster flashing of the LED lights indicates a potentially more dangerous condition (e.g., speeding vehicle).

In FIG. 2, the detector unit 141 is mounted to the same pole 111 as the sign 101. A bracket and other attaching components are omitted from FIG. 2 for sake of convenience. In FIG. 2, lettering on the sign 101 is also omitted for sake of clarity of illustration. However, conventional attaching elements may be used in conjunction with the housing 206 to place the detector unit 141 in a functional position relative to the sign 101. The detector unit 141 broadcasts a detection signal within a detection zone 202. The detection zone 202 is not shown to scale and covers a substantial distance in a first direction 207 relative to the sign 101. The detection zone 202 may be a first detection zone and the detector unit 141 may project a second detection signal in a second direction relative to the sign 101. The detector unit 121 may include a battery or other power source for operating the light panels or strips. The detector unit 121 may be powered by conventional means such as AC current, direct current and/or solar panels. These elements are not illustrated for sake of convenience.

In FIG. 2, the light strip 103 includes a portion of a cable 204 for the light panel 103. The cable 204 lies as flat as possible as it wraps around behind the sign 101. The cable 204 may carry power to the light strip 103 including to the first column 104 and the second column 105 of lights. Further, the cable 204 may carry a signal to and from the detector unit 141. The cable 204 may run along a path 205 along the back of the sign 101 and down the post 111 to, and into, the housing 206 of the detector unit 141. The presence of the power cable is installed so as to have a minimal impact on the outer perimeter shape of the sign to which the LED light panel is attached. The cable 204 is slightly visible from the back of the sign, and is preferably not visible from the front of the sign.

The sign 101 includes a first color band 108 on the front surface 107 and includes a second color 108 along a band or tape line of the front surface 107 of the sign. The light strip 103 includes a corresponding colored stripe or band 106 made of a same material and of a substantially same color and appearance as the band 108 of a second color on the face 107 of the sign 101. According to an example implementation, a color of the lights of the first column 104 correspond to and match a color of the face 203 of the light strip 103.

A color of the lights of the second column 105 correspond to and match a color of the strip 106 on the front face 203 of the light strip 103. An exterior side 208 may be painted, coated, or otherwise colored black so as to blend into the side profile of the sign 101 as visible in FIG. 2. As shown in FIG. 1, the light strips 103 are substantially invisible when viewed from a front direction. The illustration of FIG. 2 emphasizes a profile height 201 that each light panel or light strip 103 raises above the front face 107 of the sign 101. In certain embodiments, the profile height is less than 1.0 inches, 0.5 inches, 0.3 inches, and 0.2 inches. The profile height 201 extends a distance along a z-axis of the coordinate axes 112 shown.

From the perspective of a viewer standing directly in front of the sign 101, the one or more light panels 103 are minimally visible with respect to the colors, materials, shapes, and other aspects of the sign 101. According to some implementations, the light panel 103 is colored to match those colors and reflectivities of the sign 101. A thickness of the light panel 103 is selected to be as thin as possible along the front surface 107 of the sign 101. Each light panel 103 may extend along an x-axis or y-axis outside of the perimeter of the sign 101. However, any extensions outside of the perimeter of the sign 101 in the x-axis and y-axis are minimized so as to minimally disturb a silhouette of the sign 101. For example, a light panel is less than 0.5 inches wide in the x-axis along its entire length. According to one implementation, the LED lights of the columns of lights 104, 105 do not protrude above a top plane or top surface 203 of the light panel 103.

In FIG. 2, while the light panel 103 is shown as uniform in thickness vertically and horizontally (along the x-axis and y-axis, respectively), in other implementations the LED panels may be tapered—for example, thin at the outside edge 127 of the sign 101, and relatively thicker at an inside edge of the sign 101 at the inside edge 132 of the light panel 103. Alternatively, the light panel is thin at the bottom 209, and thicker at the top 210.

In FIG. 2, in yet another alternative configuration, each panel 103 has a curved (from left to right along the x-axis) or semi-circular top surface 203 or thickness profile. Each light panel 103 is blended into the appearance of the sign. Each light panel 103 may lie across a boundary of a first color and a second color on the front face 107 of the sign 101. Alternatively, each light panel 103 is sized and mounted to only be within one color or one background region of a sign 103 such as a boundary color. According to some embodiments, no part of each light panel 103 crosses, overlaps or extends outside of the profile of the sign 101 as viewed from the front of the sign 101. In that way, the shape of the sign is not altered and thereby does not substantially alter the appearance of the sign 101 when the lights of the light panel 103 are not illuminated. Thus, the shape of the sign 103 with light panels 103 has a same meaning to an observer as a sign without light panels.

The example embodiment illustrated in FIG. 2 shows that the light panel 103 is entirely mounted to the front surface 103 of the sign 101. This allows the light panel 103 to be fit or mounted to the sign 103 without substantially altering the sign (e.g., without drilling holes for each light to protrude through an opening in the sign 101). Thus, an entirely new sign is not needed and existing signs such as sign 101 can be retrofitted with light panels 103 as described herein. This allows the LED light panels 103 to be installed with a minimal amount of labor.

Figure 3:
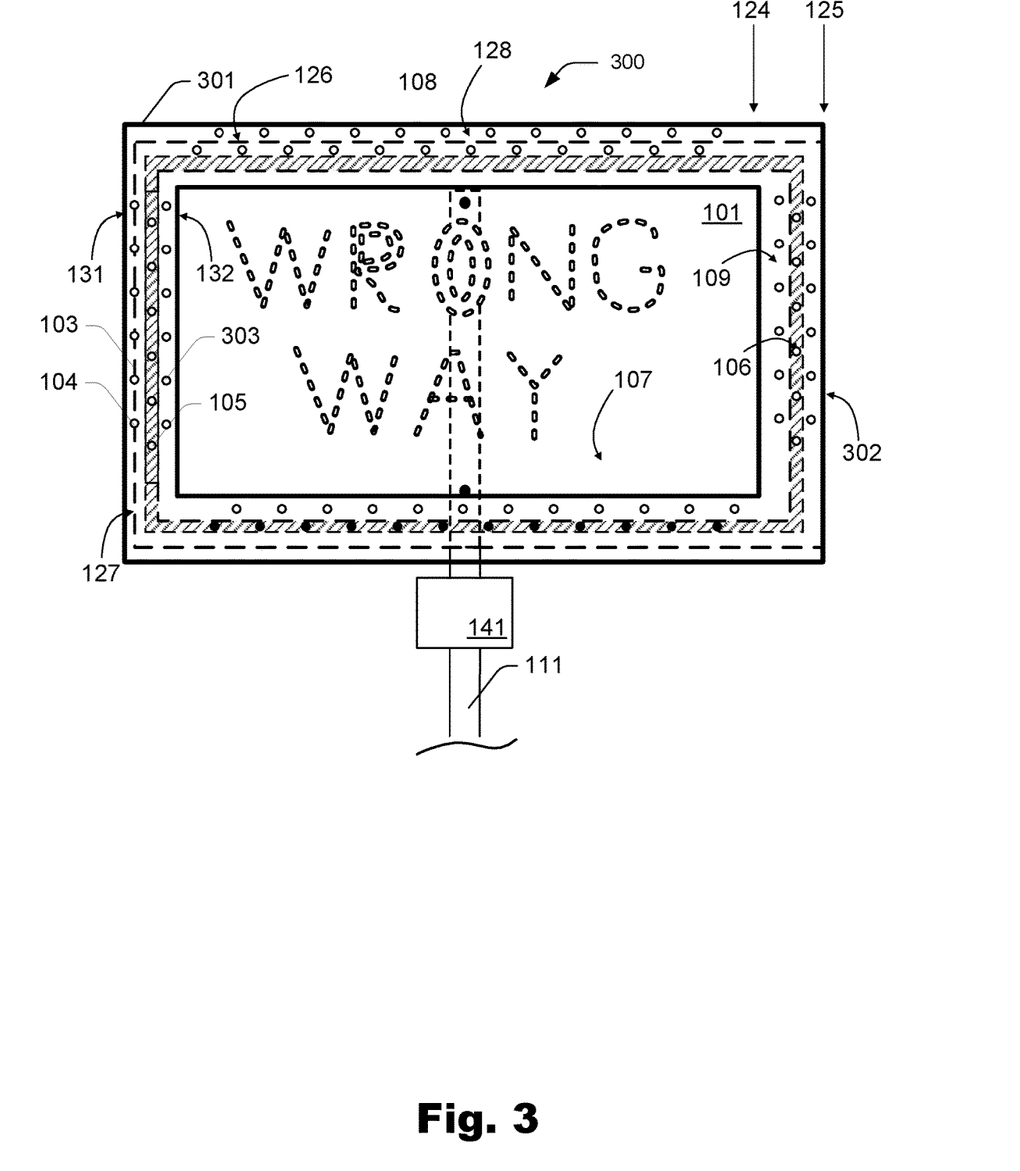
FIG. 3 is a diagram illustrating a front view of a sign fitted with lights along an entirety of a perimeter of a sign in accordance with some embodiments.

According to an implementation, the illumination components (e.g., panels 103, controller, and power supply) are attached by cables to other components such as the detector unit 141. Although not shown, the wiring for the LED panels may be placed under a black back plate or heavy black tape on the back of the sign 101 to discourage observers from disabling or altering the wiring of the light panels 103. In FIG. 3, according to some example embodiments, each light panel 103 includes a black side edge 208. In one implementation, and as shown in FIG. 2, a thickness of the light panel 103 is uniform from a top surface 210 to a bottom surface so as to track the edge and shape of sign 101. The light panels 103 are activated through the cables that connect the panels to the detector unit 141.

According to example embodiments, an LED color of particular lights of the light panel 103 may be based on the type of sign to which it is affixed and configured per the Manual on Uniform Traffic Control Devices (MUTCD) 2A.07 paragraphs 08, 09, and 10 which are herein incorporated in their entirety by reference. The LED color may match one or more colors of the sign or object to which it is attached. For example, LED lights that overlay a white stripe or white lettering of a sign may be white, while LED lights that overlay a red background of the sign are red. The LED lights, when illuminated, enhance the meaning of the sign in the mind of an observer or vehicle operator.

The new method of illumination for traffic signs fulfills a need for an inexpensive system that uses existing infrastructure to draw the attention of a vehicle operator to a standard traffic control sign in time to take appropriate action.

The face mounted flasher bars or strips 103 address sign illumination needs per MUTCD guidelines Section 2A.07.06 through section 2A.07.11, 2009 Edition, Revision 2. Flasher bar assemblies attach to existing sign faces 107 and provide illumination. LED lights may be available at least in red, amber and white. An LED light panel or light bar 103 incorporates reflective sheeting reasonably consistent with a face of the sign to which the LED panel is attached.

While the light panels 103 are illustrated as attached to a wrong way sign in FIG. 1, one or more LED light panels may be attached to any and all types of traffic signage, including but not limited to, warning, regulatory, temporary, and construction signage.

FIG. 3 is a diagram illustrating a front view of a sign fitted with lights along an entirety of a perimeter of a sign in accordance with some embodiments. In FIG. 3, a sign 101 has mounted to it a system 300 that includes a light panel frame 301 that extends along an entire perimeter of the sign 101. The light panel frame 301 includes a right edge 302 that fits flush against a vertical edge 127 or side of the sign 101. The outer edge 131 on the left side of the light panel frame 301 is not fit flush for sake of illustration. The light panel frame 301 includes a first line 104 of lights, a second line of lights 105, and a third line of lights 303. The first line 104 of lights is in a white stripe 128 along the outer edge of the front face 107 of the sign 101. The second line 105 of lights is within a colored stripe 106 of the light-equipped frame 301. The third line 303 of lights is within the colored stripe 106. The colored stripe 106 of the light panel frame 301 takes the place of a colored stripe that would be present in the sign 101 without the frame 301. The system 300 includes a detection unit 141 mounted to a pole 111 that also supports the sign 101. The top surface 109 of the light panel frame 301 is shown substantially planar but not completely co-planar with a top surface 107 of the sign 101.

Figure 4:
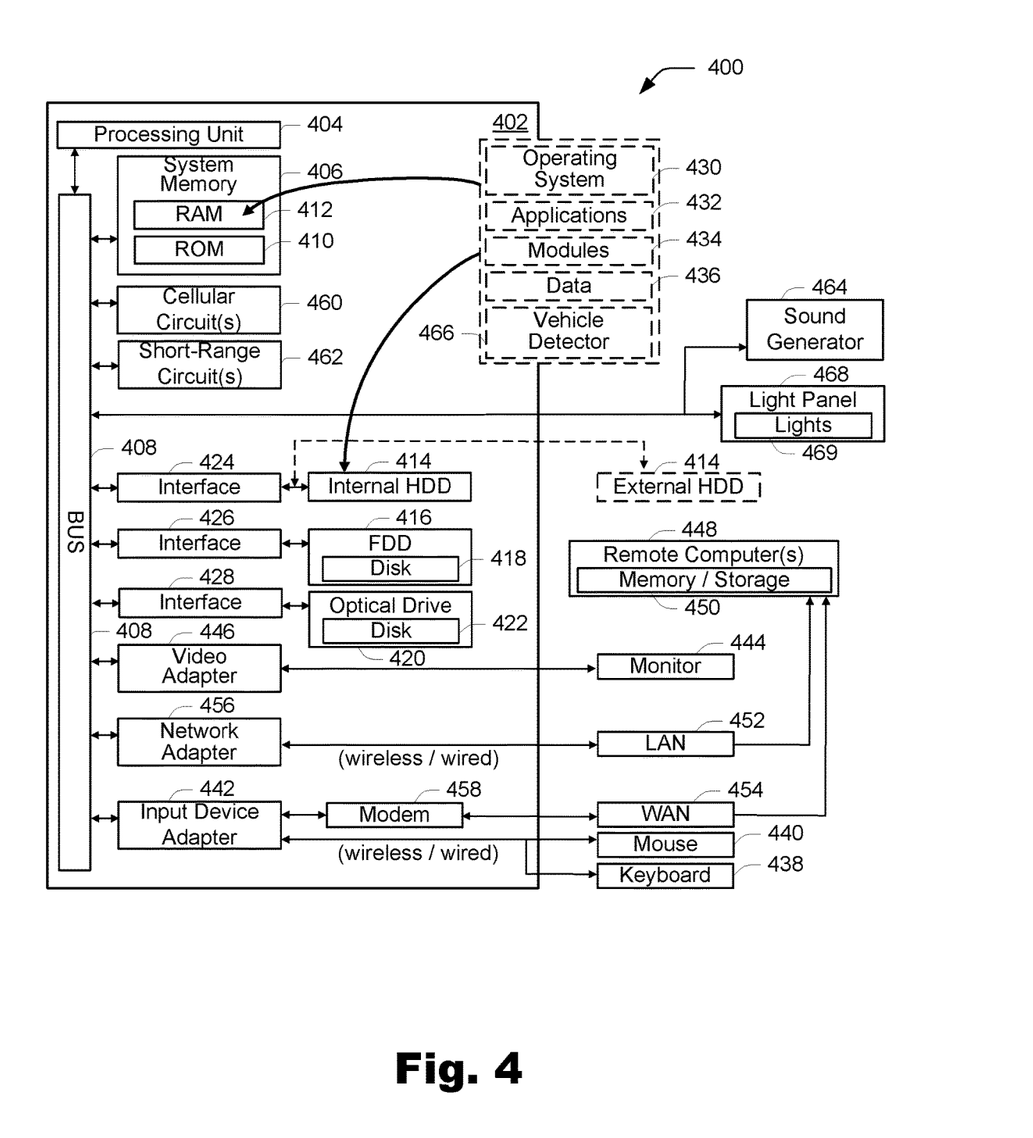
FIG. 4 is a diagram schematically illustrating components of a light panel and related control components in accordance with some embodiments.

FIG. 4 is a diagram schematically illustrating components of a light panel and related control components in accordance with some embodiments. While the technology has been described above in the general context of controllerexecutable or computer-executable instructions that may run on one or more devices, those skilled in the art will recognize that the technology also can be implemented in combination with other program modules and/or as a combination of hardware and software.

Program modules can include routines, programs, components, data structures and so forth, that perform particular tasks or implement particular data types. Moreover, the methods can be practiced with other computer system configurations, including single-processor or multiprocessor computer systems, mini-computers, server-scale computers, as well as small computers, hand-held or mobile computing devices, microprocessor-based or programmable consumer electronics such as mobile phones, tablets, vehicle detectors, proximity detectors, motion detectors, and the like, each of which can be operatively coupled to one or more associated devices.

The described technology may also be practiced in distributed computing environments where certain tasks are performed by remote processing devices that are linked through a communications network. In a distributed computing environment, program modules can be located in both local and remote memory storage devices.

A computer includes a variety of computer-readable media. Computer-readable media can be any available media that can be accessed by the computer and includes both volatile and nonvolatile media, removable and non-removable media. By example and not limitation, computer-readable media can include computer storage media and communication media. A computer storage medium can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic tape, magnetic disk storage or other magnetic storage devices, or any other medium which can be used to store the desired information and which can be accessed by the computer. The computer storage medium may or may not be local to the system 400.

Communication media embody computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or direct-wired connection, and wireless media such as acoustic, RF, infrared and other wireless media. Combinations of the any of the above can be included within the scope of computer-readable media.

In FIG. 4, the illustrated system 400 includes one or more devices such as a computer 402. In turn, the computer 402 includes a processing unit 404, a system memory 406 and a system bus 408. The system bus 408 couples system components together including, but not limited to, the system memory 406 and the processing unit 404. The computer 402 may be built on a single printed circuit board (PCB) or may be split across multiple such PCBs. The processing unit 404 can be any of various commercially available processors. Dual microprocessors and other multi-processor architectures may also be employed as the processing unit 404.

The system bus 408 can be any of several types of bus structure that may further interconnect to a memory bus (with or without a memory controller), a peripheral bus, and a local bus using any of a variety of commercially available bus architectures. The system memory 406 includes read-only memory (ROM) 410 and random access memory (RAM) 412. A basic input/output system (BIOS) may be used and the BIOS may be stored in a non-volatile memory 410 such as ROM, EPROM, EEPROM, which BIOS contains the basic routines that help to transfer information between elements within the device 402, such as during device start-up. The RAM 412 can also include a high-speed RAM such as static RAM for caching data.

The computer 402 further includes an internal hard disk drive (HDD) 414 (e.g., EIDE, SATA), which internal hard disk drive 414 also may be externally used in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The hard disk drive 414, magnetic disk drive 416, and optical disk drive 420 can be connected to the system bus 408 by a hard disk drive interface 424, a magnetic disk drive interface 426, and an optical drive interface 428, respectively. The interface 424 for external drive implementations includes at least one or both of Universal Serial Bus (USB) and IEEE 1394 interface technologies. A flash drive or flash-based memory (not shown) may be plugged directly into a physical adapter of the interface 424 for providing read/write storage to the computer 402. Other external storage connection technologies are within contemplation of the system 400.

The drives and their associated computer-readable media provide nonvolatile storage of data, data structures, computer-executable instructions, and so forth. For the computer 402, the drives and media accommodate the storage of any data in a suitable digital format. Although the description of computer-readable media above refers to a HDD, a removable magnetic diskette, and a removable optical media such as a CD or DVD, other types of media which are readable by a computer, such as zip drives, magnetic cassettes, flash memory cards, cartridges, and the like, may also be used in the exemplary operating environment, and further, that any such media may contain computer-executable instructions for performing the methods of the technology.

A number of program modules can be stored in the drives and RAM 412, including an operating system 430, one or more application programs 432, other program modules 434, and program data 436. All or portions of the operating system, applications, modules, and/or data can also be cached in the RAM 412. It is appreciated that the technology described herein can be implemented with various commercially available operating systems or combinations of operating systems.

A user can enter commands and information into the computer 402 through one or more wired/wireless input devices, e.g., a keyboard 438 and a pointing device, such as a mouse 440 as necessary. Other input devices (not shown) may include a microphone, an IR remote control, a joystick, a game pad, a stylus pen, touch screen, or the like. These and other input devices are often connected to the processing unit 404 through an input device interface 442 that is coupled to the system bus 408, but can be connected via other interfaces, such as a parallel port, an IEEE 1394 serial port, a game port, a USB port, and an IR interface. Additionally, the computer 402 includes one, two or more inputs that facilitate delivery of signals, data, or images to the computer 402 from external devices, components, or circuitry such as a light panel 468 that includes one or more lights 469, the panel 468 attached to a sign or near a sign such as the sign illustrated in FIGS. 1-3. The computer 402 may operate as the detector unit 141 and may provide instructions, control signals and the like to the light panels 468 and, optionally, a sound generator 464. The sound generator 464 may operate in conjunction with the light panels 468 to generate warnings to those in the vicinity of a sign equipped with elements of embodiments as described herein. The light panel or panels 468 may have their own operating system, control system, and the like, and may thus only interact with the computer 402 through the system bus 408.

A monitor 444 or other type of display device may also be connected to the system bus 408 via an interface, such as a video adapter 446 such as at a startup or a configuration operation. In addition to the monitor 444, the computer 402 may include one or more other peripheral output devices (not shown), such as speakers, printers, etc.

The computer 402 is communicatively coupled (e.g., via wireless network, direct wiring) to the light panel 468. That is, the computer 402 and light panel 468 could be proximate to each other, or could be separated from each other.

In FIG. 4, the computer 402 may operate in a networked environment using logical connections via wired and/or wireless communications to one or more remote devices or computers, such as a remote computer(s) 448, the light panel 468, and so forth. The remote computer(s) 448 can be a workstation, a server computer, a router, a personal computer, a portable computer, a microprocessor-based entertainment appliance, a peer device or other common network node, and includes many or all of the elements described relative to the computer 402, although, for purposes of brevity, only a memory/storage device 450 is illustrated. The logical connections depicted include wired/wireless connectivity to a local area network (LAN) 452 and/or larger networks, e.g., a wide area network (WAN) 454. Such LAN and WAN networking environments are commonplace, and facilitate network communications.

When used in a LAN networking environment, the computer 402 may be connected to a local network 452 through a wired and/or wireless communication network interface or adapter 456. The adapter 456 may facilitate wired or wireless communication to the LAN 452, which may also include a wireless access point disposed thereon for communicating with the wireless adapter 456. For participating in a network, the computer 402 may use one or more cellular circuits 460 and/or one or more short-range circuits 462. The short-range circuit(s) 462 enable direct-sequence spread spectrum (DSSS) communications. Through the cellular circuit(s) 460, the system is able to generate and send live email messages, SMS texts, and provide smartphone notifications (e.g., such as via direct-to-app messages).

When used in a WAN networking environment, the computer 402 can include a modem 458, or is connected to a communications server on the WAN 454, or has other means for establishing communications over the WAN 454, such as by way of the Internet. A modem 458, which can be internal or external and a wired or wireless device, is connected to the system bus 408 via a serial port interface 442. In a networked environment, program modules depicted relative to the computer 402, or portions thereof, can be stored in the remote memory/storage device 450. It will be appreciated that the network connections shown are exemplary and other means of establishing a communications link between the computers can be used, as previously described.

Each computer 402 in the system is operable to communicate with wireless devices or entities operatively disposed in one or more wireless communication ranges. The computer 402 may participate via a short-range communication, a cellular communication via a cell tower, a communication to or from a satellite, or to or from any piece of equipment associated with a wirelessly detectable tag. This computer 402 and system includes at least one of a Wi-Fi (IEEE 802.11 standard) technology, a Bluetooth wireless technology, a TDMA or CDMA wireless technology, a ZigBee (IEEE 802.15.4 standard) technology, or other wireless technology. Thus, the communication can be a predefined structure as with a conventional network or simply an ad hoc communication between at least two devices.

Conclusion. Although the system has been described with reference to specific exemplary embodiments, it will be evident that modifications and changes can be made to these embodiments without departing from the broader spirit of the disclosure. Accordingly, the specification and drawings are to be regarded in an illustrative sense rather than in a restrictive sense.

Similarly, while certain exemplary embodiments have been described and shown in the accompanying drawings, it is to be understood that such embodiments are merely illustrative and not restrictive of the broad disclosure and that the provided disclosure is not limited to the specific constructions and arrangements shown and described herein, since various other modifications may be made according to the abilities of those ordinarily skilled in the art upon studying this disclosure. The disclosed embodiments may be readily modifiable as facilitated by enabling technological advancements without departing from the principals of the present disclosure.

What is claimed is:

1. A system for detecting a vehicle traveling against a designated direction of travel on a roadway, the system comprising:
    a sign having a front surface and a back surface, the front surface including a first color;
    a light panel affixed to the sign, a portion of the light panel laying over the front surface of the sign, wherein the light panel includes
        a first set of lights mounted within the light panel and arranged relative to a body of the light panel so as to lie below a top surface plane of the light panel,
        the top surface plane extending parallel to a plane of the front surface of the sign and each of the lights of the first set of lights is oriented normal to the plane of the front surface of the sign, and
        wherein a color of a top surface of the light panel matches the first color of the front surface of the sign over which the light panel is placed; and
    a vehicle proximity detector oriented in a first direction and having a first detection zone, wherein the detector is mounted proximate to the sign, wherein the detector is programmed to detect moving vehicles in proximity to the sign, and wherein the detector is programmed to illuminate lights of the first set of lights of the light panel in response to detecting a moving vehicle in proximity to the sign.

2. The system of claim 1, wherein the detector is configured to provide electric power to the first set of lights of the light panel and is coupled to the light panel via a cable that passes along a portion of the back surface of the sign.

3. The system of claim 1, wherein the sign includes a sign boundary marker on the front surface of the sign that is different in color than the first color of the front surface.

4. The system of claim 3, wherein the light panel includes a second set of lights mounted within the light panel, wherein each light of the second set of lights is arranged over the sign boundary marker and each of the lights of the second set of lights is oriented normal to the plane of the front surface of the sign, wherein each light of the first set of lights is of a same color as the first color of the front surface of the sign, and wherein each light of the second set of lights is of a same color as the sign boundary marker on the front surface of the sign.

5. The system of 1, wherein an exterior side of the light panel is black.

6. The system of claim 1, wherein each light of the first set of lights includes a light emitting diode (LED).

7. The system of claim 1, wherein the detector is programmed to detect the moving vehicles traveling against the designated direction of travel with respect to the sign, and wherein the detector is programmed to illuminate the first set of lights of the light panel until a fixed time after detection of another vehicle passing into and out of the first detection zone.

8. A system for detecting a vehicle traveling against a designated direction of travel on a roadway, the system comprising:
- a sign having a front surface and a back surface, the front surface including a first region of a first color and a second region of a second color;
- a light panel affixed along a portion of a perimeter of the sign and at least partially overlying the first region of the sign, the light panel including a first surface of a first color, the first surface of the light panel overlying a portion of the first region of the sign, the first color of the light panel matching the first color of the first region of the sign, and the light panel having a top surface plane extending parallel to a plane of the front surface of the sign;
- a first set of lights mounted in openings within a body of the light panel and arranged relative to the body of the light panel, wherein each of the lights of the first set of lights is oriented normal to the plane of the front surface of the sign and each of the lights of the first set of lights is mounted below the top surface plane within the light panel; and
- a vehicle proximity detector oriented in a first direction and having a first detection zone, wherein the detector is mounted proximate to the sign, wherein the detector is programmed to detect moving vehicles in proximity to the sign, and wherein the detector is programmed to illuminate the lights of the first set of lights of the light panel for a first time duration in response to detecting a moving vehicle in proximity to the sign.

9. The system of claim 8, wherein the light panel is shaped to correspond to an entire perimeter of the sign.

10. The system of claim 9, wherein each of the lights of the first set of lights are mounted below the top surface plane within the light panel at points along the entire perimeter of the sign.

11. A light panel for a traffic sign, the light panel comprising:
- a first surface of at least a first color, the first surface forming:
  - a first set of openings in the first surface,
  - a second set of openings in the first surface, and
  - a third set of openings in the first surface;
- a second surface for mounting to a front surface of the traffic sign, the second surface overlying a first portion of a first color of the traffic sign and overlying a second portion of a second color of the traffic sign, wherein the second color of the traffic sign matches a sign boundary marker of the traffic sign;
- a body extending between the first surface and the second surface of the light panel;
- a first set of lights mounted in the body of the light panel and proximate to the first set of openings in the first surface of the light panel, the first set of lights mounted below a plane of the first surface;
- a second set of lights mounted in the body of the light panel and proximate to the second set of openings in the first surface of the light panel, wherein the second set of lights are mounted below the plane of the first surface and have a color matching the sign boundary marker of the traffic sign; and
- a third set of lights mounted in the body of the light panel and proximate to the third set of openings in the first surface of the light panel, wherein each of the third set of openings is interior to a line defined by at least some of the second set of openings, and wherein each of the third set of lights is of the first color of the traffic sign.

12. The light panel of claim 11, wherein the first surface further comprises a second color, the first color of the first surface overlying the first portion of the traffic sign, the second color of the surface overlying the second portion of the traffic sign.

13. The light panel of claim 12, wherein each of the first set of lights matches the first color of the traffic sign.

14. The light panel of claim 11, further comprising a third surface for mounting adjacent a lateral surface of the traffic sign, the third surface including a coating of a light-absorbing pigment.

15. The light panel of claim 11, further comprising:
- a timer for controlling illumination of the first set of lights for a predetermined amount of time according to a first flashing pattern upon the light panel receiving an electronic signal from a device.

16. The light panel of claim 11, further comprising a controller to activate the first set of lights responsive to a detector detecting a vehicle proximate to the light panel, the activation varied according to a temporal pattern varying according to a proximity of the detected vehicle traveling in a first direction relative to the light panel or according to a detected speed of the detected vehicle with respect to a speed limit threshold.

17. The light panel of claim 11, further comprising a controller to activate the first set of lights responsive to a detector detecting a speed of a vehicle proximate to the light panel, the activation varied according to the speed of the vehicle traveling in a first direction relative to the light panel.

* * * * *